US012695742B1

(12) United States Patent
Vashi

(10) Patent No.: US 12,695,742 B1
(45) Date of Patent: Jul. 28, 2026

(54) SYSTEM, METHOD, AND COMPUTER PROGRAM FOR CLIENT AUTHENTICATION AND AUTHORIZATION IN ORACLE TUXEDO USING JSON WEB TOKENS

(71) Applicant: Amdocs Development Limited, Limassol (CY)

(72) Inventor: Viral Vashi, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 72 days.

(21) Appl. No.: 18/773,362

(22) Filed: Jul. 15, 2024

(51) Int. Cl.
*H04L 29/00* (2006.01)
*H04L 9/40* (2022.01)

(52) U.S. Cl.
CPC ................................... *H04L 63/083* (2013.01)

(58) Field of Classification Search
CPC ...................................................... H04L 63/083
See application file for complete search history.

(56) References Cited

U.S. PATENT DOCUMENTS

| | | | |
|---|---|---|---|
| 6,571,282 B1 * | 5/2003 | Bowman-Amuah | ........................ H04L 67/303 719/329 |
| 6,601,192 B1 * | 7/2003 | Bowman-Amuah | ... H04L 43/50 714/38.12 |
| 6,606,660 B1 * | 8/2003 | Bowman-Amuah | ... H04L 67/34 709/227 |
| 6,615,253 B1 * | 9/2003 | Bowman-Amuah | ........................ G06F 16/9574 709/219 |
| 6,640,238 B1 * | 10/2003 | Bowman-Amuah | ........................ H04L 67/568 709/224 |
| 6,640,244 B1 * | 10/2003 | Bowman-Amuah | ... G06F 9/466 707/999.01 |
| 6,640,249 B1 * | 10/2003 | Bowman-Amuah | ..... G06F 8/36 709/228 |
| 6,742,015 B1 * | 5/2004 | Bowman-Amuah | ..... G06F 8/20 718/100 |
| 6,842,906 B1 * | 1/2005 | Bowman-Amuah | ... G06F 9/465 719/330 |
| 6,954,220 B1 * | 10/2005 | Bowman-Amuah | ........................ G06F 21/6218 715/740 |
| 7,289,964 B1 * | 10/2007 | Bowman-Amuah | ........................ G06F 9/5038 705/1.1 |
| 7,831,999 B2 * | 11/2010 | Lo | ........................ H04L 63/0815 726/4 |
| 9,521,146 B2 * | 12/2016 | Kaluskar | ............... G06F 21/335 |
| 9,985,956 B2 * | 5/2018 | Engert | ................... H04L 63/166 |
| 10,505,916 B2 * | 12/2019 | Engan | ................. H04L 63/0272 |
| 10,715,516 B1 * | 7/2020 | Colletta | .................. G06F 21/33 |
| 10,873,587 B2 * | 12/2020 | Kuperman | .......... H04W 12/069 |

(Continued)

FOREIGN PATENT DOCUMENTS

CN 1706204 A * 12/2005 .......... H04Q 3/0025

*Primary Examiner* — Don G Zhao

(74) *Attorney, Agent, or Firm* — Zilka-Kotab, P.C.

(57) ABSTRACT

As described herein, a system, method, and computer program are provided for authenticating and authorizing Tuxedo clients using JSON web tokens. A Tuxedo server receives a service call that includes a plurality of JSON web tokens from a Tuxedo client. The Tuxedo server validates the plurality of JSON web tokens to authenticate and authorize the Tuxedo client. The Tuxedo server provides to the Tuxedo client a response to the service call based on a result of the validating.

19 Claims, 11 Drawing Sheets

100

102 receive a service call that includes a plurality of JSON web tokens from a Tuxedo client 104 validate the plurality of JSON web tokens to authenticate and authorize the Tuxedo client 106 provide to the Tuxedo client a response to the service call based on a result of the validating

(56) References Cited

U.S. PATENT DOCUMENTS

| | | | | | |
|---|---|---|---|---|---|
| 11,153,363 | B1 * | 10/2021 | Speller, III | .......... | H04L 63/0807 |
| 11,805,127 | B1 * | 10/2023 | Sundar | .................. | H04L 63/102 |
| 12,177,352 | B2 * | 12/2024 | Poole Siguero | ...... | H04L 67/146 |
| 2003/0172145 | A1 * | 9/2003 | Nguyen | ................ | H04L 12/185 |
| | | | | | 709/223 |
| 2004/0158737 | A1 * | 8/2004 | Lo | .......................... | H04L 63/102 |
| | | | | | 726/4 |
| 2006/0059107 | A1 * | 3/2006 | Elmore | .................. | G06Q 10/06 |
| | | | | | 705/64 |
| 2011/0023095 | A1 * | 1/2011 | Lo | .......................... | H04L 63/102 |
| | | | | | 726/4 |
| 2018/0012012 | A1 * | 1/2018 | Stone | ...................... | G06F 21/41 |
| 2018/0359201 | A1 * | 12/2018 | Rangasamy | ............ | H04L 67/10 |
| 2019/0028459 | A1 * | 1/2019 | Fries | ........................ | G06F 21/44 |
| 2019/0044740 | A1 * | 2/2019 | Smith | ................. | H04W 12/009 |
| 2019/0104196 | A1 * | 4/2019 | Li | ...................... | G06Q 20/3823 |
| 2020/0007531 | A1 * | 1/2020 | Koottayi | ............... | H04L 67/146 |
| 2020/0065300 | A1 * | 2/2020 | Yang | .......................... | H04L 9/50 |
| 2020/0162256 | A1 * | 5/2020 | Pourtabatabaie | ..... | H04L 9/0872 |
| 2020/0186568 | A1 * | 6/2020 | Erb | ........................ | H04L 9/0841 |
| 2021/0019434 | A1 * | 1/2021 | Bibliowicz | ......... | G06F 21/6218 |
| 2021/0243026 | A1 * | 8/2021 | Mohassel | ............... | H04L 9/085 |
| 2021/0385083 | A1 * | 12/2021 | Lenglet | ................. | H04L 9/3213 |
| 2022/0138182 | A1 * | 5/2022 | Yang | ..................... | G06F 16/245 |
| | | | | | 707/703 |
| 2022/0150066 | A1 * | 5/2022 | Sugarev | ................. | H04L 9/3247 |
| 2022/0217124 | A1 * | 7/2022 | Fryer | ..................... | H04L 63/10 |
| 2022/0292500 | A1 * | 9/2022 | Ward | .................... | H04L 9/3265 |
| 2022/0351156 | A1 * | 11/2022 | Ghorbani | ............. | G06Q 20/02 |
| 2023/0367833 | A1 * | 11/2023 | Kol | ....................... | G06F 16/958 |
| 2024/0171579 | A1 * | 5/2024 | Paraskeva | .......... | H04L 63/0428 |
| 2025/0053459 | A1 * | 2/2025 | Pedone | ................. | G06F 9/541 |
| 2025/0125965 | A1 * | 4/2025 | Galal | ................... | H04L 9/3226 |
| 2025/0132916 | A1 * | 4/2025 | Rule | .................... | H04L 9/3231 |
| 2025/0202719 | A1 * | 6/2025 | Gaddam | .............. | H04L 9/3271 |

* cited by examiner

100

102    receive a service call that includes a plurality of JSON web tokens from a Tuxedo client 104    validate the plurality of JSON web tokens to authenticate and authorize the Tuxedo client 106    provide to the Tuxedo client a response to the service call based on a result of the validating

200

SYSTEM, METHOD, AND COMPUTER PROGRAM FOR CLIENT AUTHENTICATION AND AUTHORIZATION IN ORACLE TUXEDO USING JSON WEB TOKENS

FIELD OF THE INVENTION

The present invention relates to client authentication and authorization processes.

BACKGROUND

Today, a Tuxedo server can be secured with transport security layer (TLS) authentication or using application/user password. In addition, authorization is controlled with an access control list. However, out of the box Tuxedo does not support OAuth2 which is the "Open Authorization" standard designed to allow applications to access resources hosted by other applications on behalf of user.

Due to the reliance on information passed as a request for authentication, the Tuxedo server faces a challenge. The client credential, if leaked, could be exploited by unauthorized parties to call the Tuxedo server, potentially resulting in a security breach.

There is thus a need for addressing these and/or other issues associated with the prior art. For example, there is a need to provide client authentication and authorization for Tuxedo systems using JavaScript Object Notation (JSON) Web Tokens (JWT tokens).

SUMMARY

As described herein, a system, method, and computer program are provided for authenticating and authorizing Tuxedo clients using JavaScript Object Notation (JSON) web tokens. A Tuxedo server receives a service call that includes a plurality of JSON web tokens from a Tuxedo client. The Tuxedo server validates the plurality of JSON web tokens to authenticate and authorize the Tuxedo client. The Tuxedo server provides to the Tuxedo client a response to the service call based on a result of the validating.

DETAILED DESCRIPTION

Figure 1:
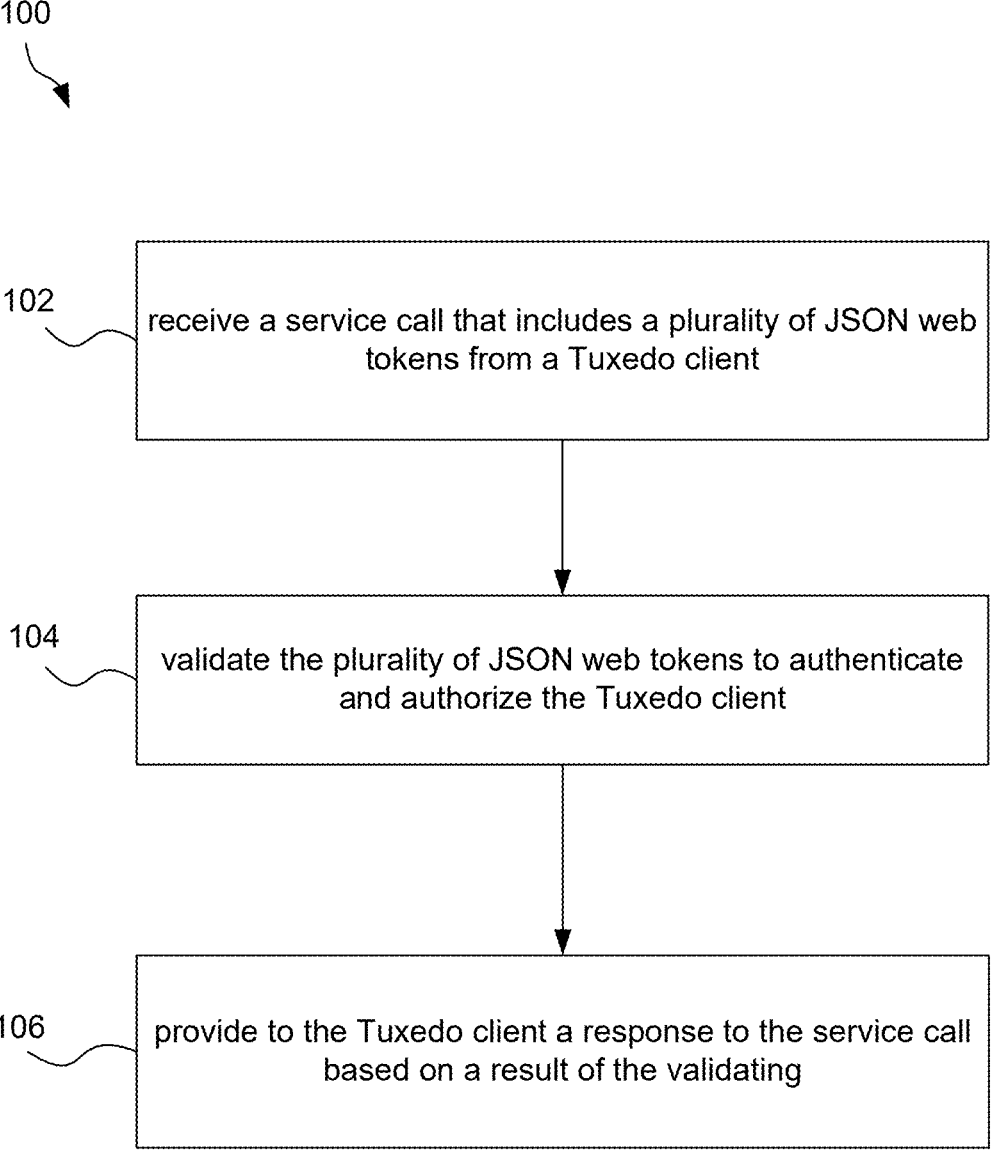
FIG. 1 illustrates a method of a Tuxedo server for authenticating and authorizing a Tuxedo client using JavaScript Object Notation (JSON) web tokens, in accordance with one embodiment.

FIG. 1 illustrates a method 100 of a Tuxedo server for authenticating and authorizing a Tuxedo client using JSON web tokens, in accordance with one embodiment. The method may be carried out by a computer system, such as that described below with respect to FIGS. 7 and/or 8.

With respect to the present description, a Tuxedo server refers to a server computer that is configured to run an Oracle Tuxedo platform. In an embodiment, the Tuxedo server may operate as a middleware platform to manage distributed transaction processing in a distributed computing environments. The Tuxedo server may interface (e.g. via a network) with a variety of Tuxedo clients which may use a variety of programming languages. The Tuxedo clients may be computing devices or applications.

The Tuxedo server may receive service calls from one or more Tuxedo clients and may process them accordingly. The service calls refer to calls for functionality of the Tuxedo server and/or for functionality of another Tuxedo client system. The present method 100 is provided to authenticate and authorize a Tuxedo client that has made a service call to the Tuxedo server, to ensure that the Tuxedo client is allowed to make the service call. This in turn will secure the Tuxedo server against unauthorized service calls including attacks via service calls. As mentioned, the method 100 is performed by the Tuxedo server.

In operation 102, a service call that includes a plurality of JavaScript Object Notation (JSON) web tokens is received from a Tuxedo client. The service call is received via an interface (e.g. application programming interface (API)) of the Tuxedo server. The service call is configured by the Tuxedo client.

As mentioned, the service call includes a plurality of JSON web tokens. In an embodiment, the plurality of JSON web tokens may be stored in a data structure included in or with the service call. In an embodiment, the plurality of JSON web tokens may be stored in a fielded buffer of the service call, where different fields of the buffer store different ones of the JSON web tokens. In an embodiment, the fielded buffer may be a Field Manipulation Language (FML) buffer.

The plurality of JSON web tokens refer to tokens defined in a JSON web format. Each of the JSON web tokens may store different information capable of being validated by the Tuxedo server as a part of a validation process for the service call. The JSON web tokens may be generated by the Tuxedo client or received by the Tuxedo client from a separate system. In an embodiment, the plurality of JSON web tokens may be signed by the Tuxedo client using a private key of the Tuxedo client.

In an embodiment, the plurality of JSON web tokens included in the service call may include an identifier token. The identifier token may uniquely identify the Tuxedo client for use by the Tuxedo server in validating that the Tuxedo client is authenticated. In an embodiment, the identifier token may be issued to the Tuxedo client or generated by the Tuxedo client.

In an embodiment, the plurality of JSON web tokens included in the service call may include an access token. In an embodiment, the access token may indicate an access permission of the Tuxedo client to the Tuxedo server for use by the Tuxedo server in validating that the Tuxedo client has authorization to access the Tuxedo server. In an embodiment, the access token may be provided to the Tuxedo client by an identity provider (IDP). In an embodiment, the access token may include a public key of the Tuxedo client. In an embodiment, the public key may be used by the Tuxedo server for validating at least another one of the plurality of JSON web tokens included in the service call.

In an embodiment, the plurality of JSON web tokens included in the service call may include a proof of possession token. The proof of possession token may be for use by the Tuxedo server in validating an integrity of data included in the service call (i.e. that no data in payload of the service call has changed in transit to the Tuxedo server). The proof of possession token may include a plurality of parameters, such as an identifier of the Tuxedo client, a hash of one or more portions of the service call (e.g. the plurality of JSON web tokens), information indicating the portions of the service call used to generate the hash, a time that the plurality of JSON web tokens were generated, a time that the plurality of JSON web tokens expire, a unique identifier, etc. In an embodiment, the proof of possession token may be generated by the Tuxedo client.

In operation 104, the plurality of JSON web tokens are validated to authenticate and authorize the Tuxedo client. The plurality of JSON web tokens may each be validated using different preconfigured validation procedures. In an embodiment, the plurality of JSON web tokens may be retrieved from the service call for validation thereof.

In an embodiment, the Tuxedo server stores a list of trusted issuers. Trusted issuers may refer to issuers of one or more of the JSON web tokens. In an embodiment, the Tuxedo server may obtain the list of trusted issuers responsive to an initial service call received by the Tuxedo server and may then cache the list of trusted issuers for use upon receipt of subsequent service calls received by the Tuxedo server. The Tuxedo server may use the list of trusted issuers to validate at least a portion of the plurality of JSON web tokens.

In an embodiment, the Tuxedo server may store a list of trusted client identifiers. The Tuxedo server may use the list of trusted client identifiers to validate at least a portion of the plurality of JSON web tokens. More details regarding the validation of the JSON web tokens will be described below with reference to the remaining figures.

In operation 106, a response to the service call is provided to the Tuxedo client based on a result of the validating. In an embodiment, the response to the service call may indicate a service failure when the validating of any of the plurality of JSON web tokens fails. For example, an error or failure notification may be returned to the Tuxedo client when the validating of one or more of the plurality of JSON web tokens fails. As a result, the Tuxedo client may be prevented for accessing a service (e.g. functionality) of the Tuxedo server.

In an embodiment, the response to the service call may indicate a service success when the validating of all of the plurality of JSON web tokens succeeds. In an embodiment, the Tuxedo client may be granted access to a service of the Tuxedo server when the validating of all of the plurality of JSON web tokens succeeds.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
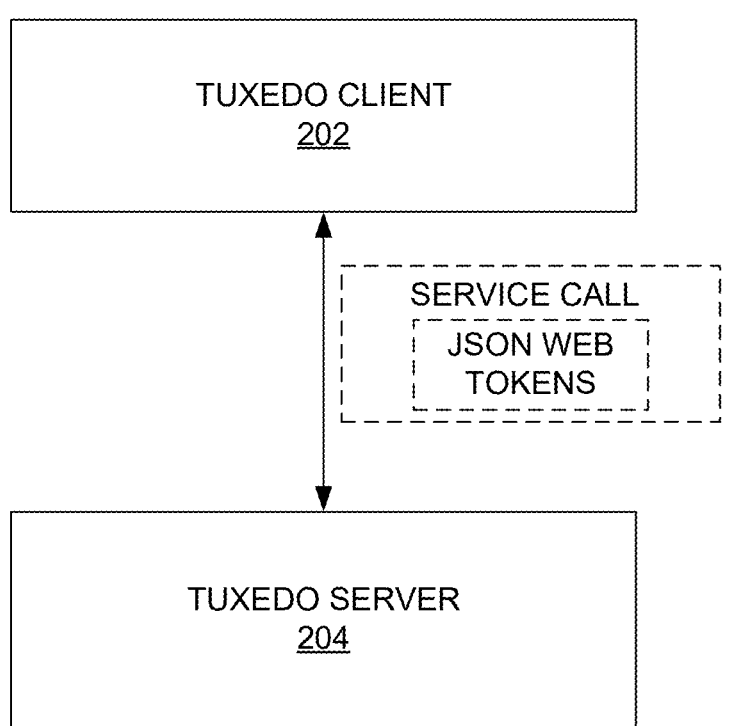
FIG. 2 illustrates a Tuxedo system that authenticates and authorizes Tuxedo clients with a Tuxedo server, in accordance with one embodiment.

FIG. 2 illustrates a Tuxedo system 200 that authenticates and authorizes Tuxedo clients with a Tuxedo server, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the Tuxedo system 200 includes a Tuxedo client 202 and a Tuxedo server 204 that interface with one another. The Tuxedo client 202 and the Tuxedo server 204 may communicate with one another via respective APIs. The Tuxedo client 202 and the Tuxedo server 204 may communicate with one another over a network.

The Tuxedo client 202 generates a service call to be sent to the Tuxedo server 204. The Tuxedo client 202 is configured to generate the service to include a plurality of JSON web tokens which may be issued to the Tuxedo client 202 by separate system(s) and/or generated by the Tuxedo client 202. The Tuxedo client 202 may store the JSON web tokens in a FML buffer of the service call.

The Tuxedo client 202 communicates the service call to the Tuxedo server 204. Upon receipt of the service call, the Tuxedo server 204 validates the JSON web tokens included therein. The Tuxedo server 204 is configured to execute a validation procedure for each of the JSON web tokens.

The Tuxedo server 204 then provides a response to the service call to the Tuxedo client 202 based on a result of the validating. In an embodiment, the response may indicate a service failure when the validating of any of the plurality of JSON web tokens fails, in which case the Tuxedo client 202 may be prevented from accessing functionality of the Tuxedo server 204 as otherwise requested via the service call. In an embodiment, the response to the service call may indicate a service success when the validating of all of the plurality of JSON web tokens succeeds, in which case the Tuxedo client 202 may be given access to the functionality of the Tuxedo server 204 as requested via the service call.

Figure 3:
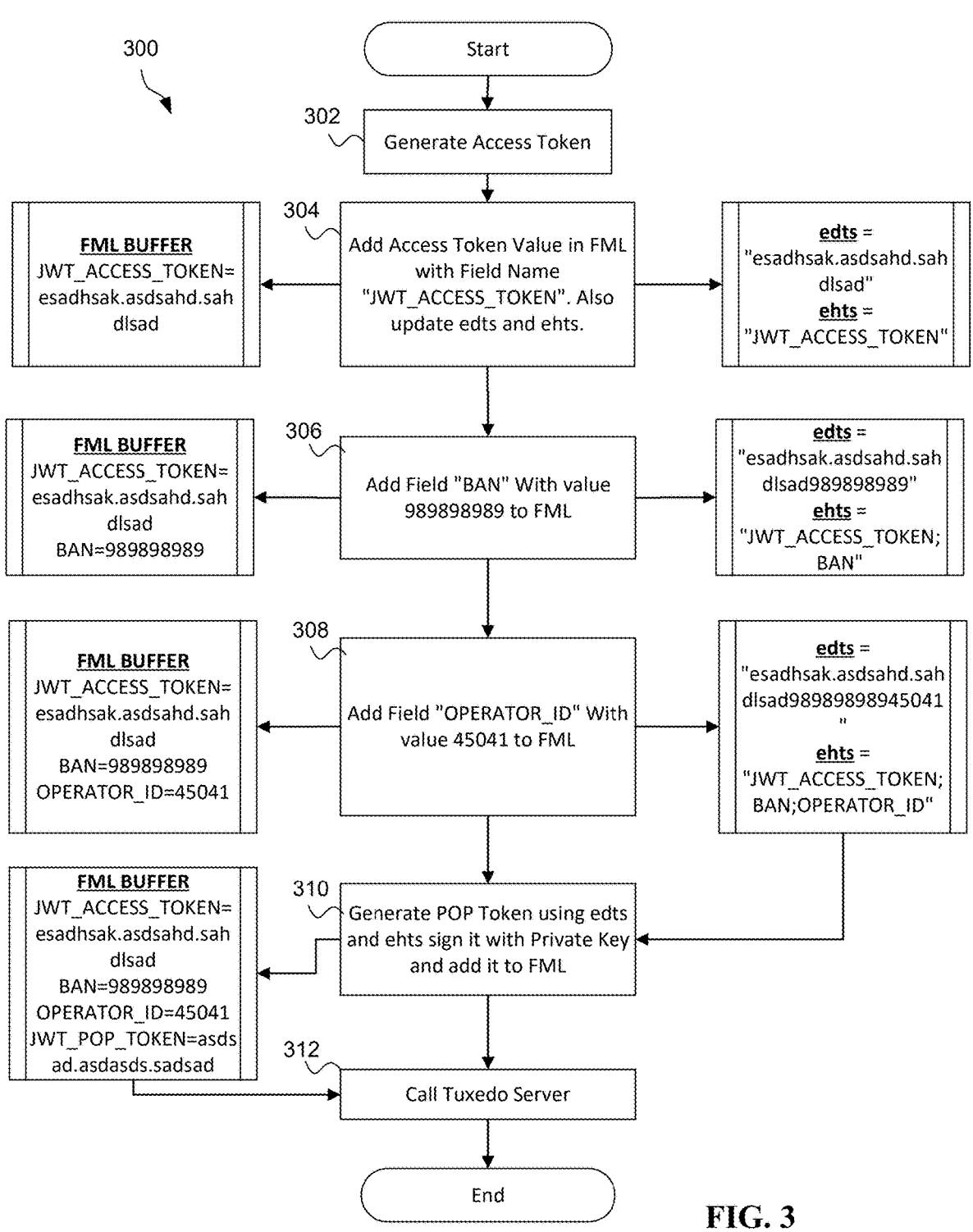
FIG. 3 illustrates a method of a Tuxedo client for generating a service call to a Tuxedo server, in accordance with one embodiment.

FIG. 3 illustrates a method 300 of a Tuxedo client for generating a service call to a Tuxedo server, in accordance with one embodiment. As an option, the method 300 may be carried out in the context of the details of the previous figure and/or any subsequent figure(s). For example, the method 300 may be carried out by the Tuxedo client 202 of FIG. 2. Of course, however, the method 300 may be carried out in the context of any desired environment. Further, the aforementioned definitions may equally apply to the description below.

In operation 302, an access token is generated. In operation 304, the access token is added to a FML buffer with the access token field name "JWT_ACCESS_TOKEN", the external data to sign (edts) field is updated to include the access token, and the external headers to sign (ehts) field is updated to include the access token field name. In an embodiment, the FML buffer may be generated by the Tuxedo client to include an identifier (ID) token in a "JWT_ID_TOKEN" field.

In operation 306, a BAN value with a BAN field name "BAN" is added to the FML buffer, the edts is updated to add the BAN value (e.g. concatenate the BAN value to the existing value in the edts), and the ehts field is updated to include the BAN field name. In operation 308, an operator identifier (ID) value with an operator ID field name "OPERATOR_ID" is added to the FML buffer, the edts is updated to add the operator ID value (e.g. concatenate the BAN value to the existing value in the edts), and the ehts field is updated to include the operator ID field name.

In operation 310, a proof of possession (POP) token is generated using the value in the edts and the value in the ehts, and the POP token is signed with a private key and added to the FML buffer with the field name "JWT_POP_TOKEN". In operation 312, the Tuxedo server is called with the FML buffer.

Table 1 illustrates the contents of the FML buffer generated by the Tuxedo client.

TABLE 1

| JWT_ID_TOKEN. |
| JWT_ACCESS_TOKEN. |
| JWT_POP_TOKEN. |

Table 2 illustrates details of the tokens included in the FML buffer fields disclosed in Table 1.

TABLE 2

JWT_ID_TOKEN.
    Tuxedo client will pass ID Token it received, or if not it will generate the ID Token.
    Tuxedo client will populate ID Token in JWT_ID_TOKEN field while calling Tuxedo Server.
JWT_ACCESS_TOKEN.
    Tuxedo client will call respective IDP (e.g. APIGEE) and generate ACCESS_TOKEN.
    Tuxedo client will populate Access Token in JWT_ACCESS_TOKEN field while calling Tuxedo Server.
JWT_POP_TOKEN
Tuxedo client will generate Proof Of Possession token with below payload claims and set it in JWT_POP_TOKEN field.
    aud
        audience i.e. calling application identifier.
        E.g. CSMONLINE
    edts
        private claim which will hold url safe base64 encoded string which will be of SHA256 hash of concatenated string created from value of all FML fields which will be passed to Tuxedo server.
        e.g. of concatenated string.
            "9898989892042042040020240101MYS OC"
    ehts
        Order of FML fields, separated by semicolon, in which string was generated to calculate edts.
        E.g.
        JWT_ACCESS_TOKEN;BAN;MSISD N;ACTIVITY_DATE;SOC
    iat
        Tokens generate time.
    exp
        Token expiration time
    jti
        Unique identifier generated with uuid.
JWT will be signed by Tuxedo Client with its RSA256 Private key.
As Tuxedo IO defers from service to service and some services have a huge list of fields in the FML buffer, in such cases passing all fields to generate edts/ehts may not be possible. In this case, the list of fields will be decided as part of interface where critical fields will be selected and should be part of the proof of possession token.

Figure 4A:
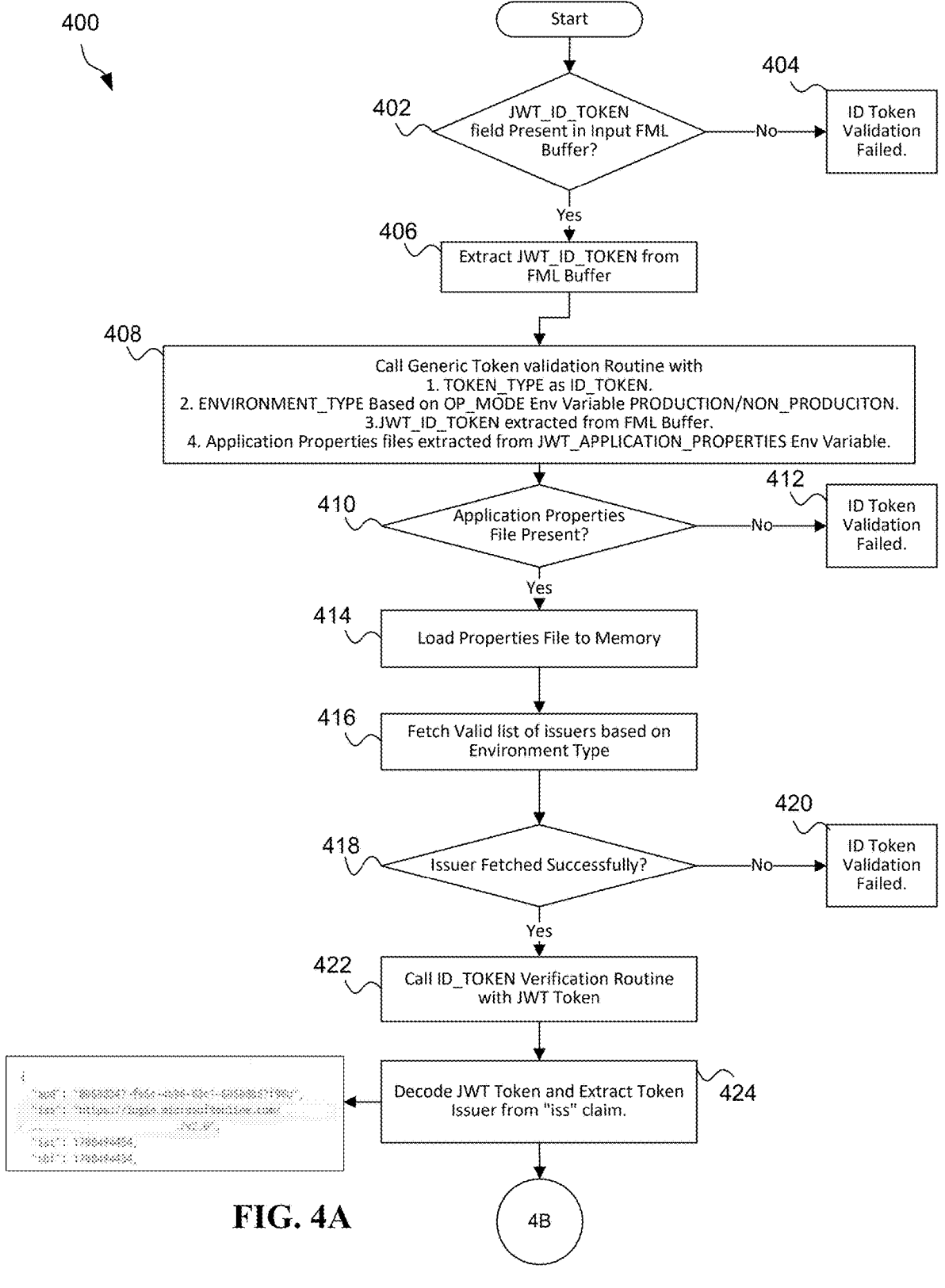
FIGS. 4A-B illustrate a method of a Tuxedo server for validating an identifier token included in a plurality of JSON web tokens of a service call, in accordance with one embodiment.
Figure 4B:
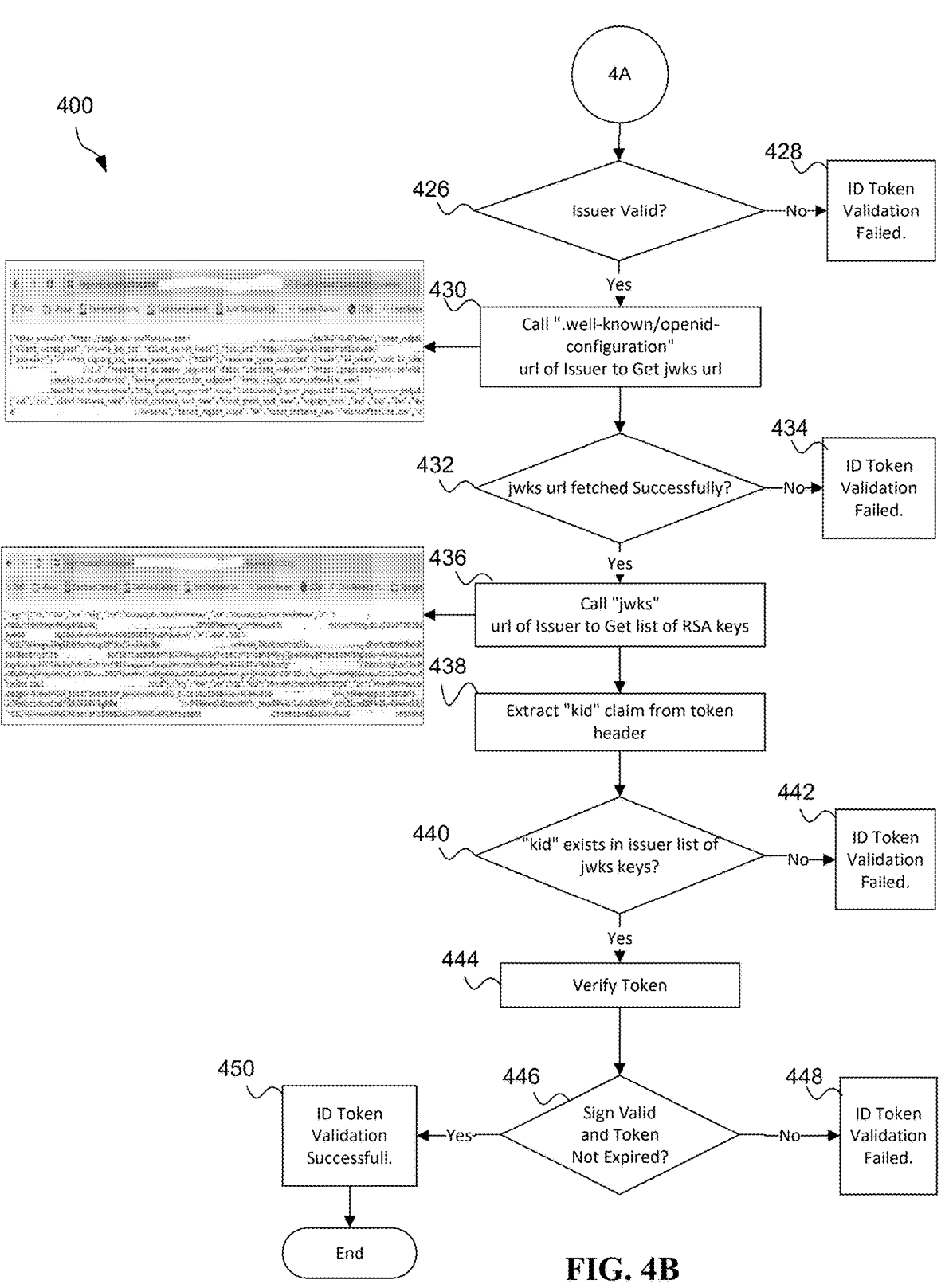

FIGS. 4A-B illustrate a method 400 of a Tuxedo server for validating an identifier token included in a plurality of JSON web tokens of a service call, in accordance with one embodiment. As an option, the method 400 may be carried out in the context of the details of the previous figure and/or any subsequent figure(s). For example, the method 400 may be carried out by the Tuxedo server 204 of FIG. 2 upon receipt of the service call of a Tuxedo client (e.g. via the method 300 of FIG. 3). Of course, however, the method 400 may be carried out in the context of any desired environment. Further, the aforementioned definitions may equally apply to the description below.

In decision 402, it is determined whether the JWT_ID_TOKEN field is present in the FML buffer. In response to determining that the JWT_ID_TOKEN field is not present in the FML buffer, validation of the ID token fails in operation 404 and the method 400 ends. In this case, the service call fails and the Tuxedo client is notified.

In response to determining that the JWT_ID_TOKEN field is present in the FML buffer, the JWT_ID_TOKEN is extracted from the FML buffer in operation 406. In operation 408, a generic token validation routine is called with parameters that include (1) token type as ID_TOKEN, (2) environment type, (3) the JWT_ID_TOKEN extracted from the FML buffer, and (4) properties of the Tuxedo client included in a properties file.

Operations 410-418 illustrate the generic token validation routine. In decision 410, it is determined whether the properties file is present. In response to determining that the properties file is not present, validation of the ID token fails in operation 412. In response to determining that the properties file is present, the properties file is loaded to memory in operation 414. In operation 416, a valid list of issuers is fetched based on the environment type.

In decision 418, it is determined whether the valid list of issuers was fetched successfully. In response to determining that the valid list of issuers was not fetched successfully, validation of the ID token fails in operation 420. In response to determining that the valid list of issuers was fetched successfully, an identifier token validation routine is called with the JWT_ID_TOKEN in operation 422.

In operation 424, the JWT_ID_TOKEN is decoded and the token issuer is extracted from an "iss" claim in the token. In decision 426 it is determined whether the issuer is valid (per the valid list of issuers). In response to determining that the issuer is not valid, validation of the ID token fails in operation 428. In response to determining that the issuer is valid, a call is made to the issuer to get a JSON Web Key Set (JWKS) uniform resource locator (URL) in operation 430.

In decision 432, it is determined whether the JWKS URL was fetched successfully. In response to determining that the JWKS URL was not fetched successfully, validation of the ID token fails in operation 434. In response to determining that the JWKS URL was fetched successfully, the JWKS URL of the issuer is called to get a list of Rivest, Shamir, Adleman (RSA) keys in operation 436. In operation 438, a "kid" is extracted from the token header.

In decision 440, it is determined whether the "kid" exists in the issuer list of JWKS keys. In response to determining that the "kid" does not exist in the issuer list of JWKS keys, validation of the ID token fails in operation 442. In response to determining that the "kid" does exist in the issuer list of JWKS keys, the token is verified in operation 444. In decision 446, it is determined whether a signature of token is valid and whether the token is expired. In response to the determining that the signature of the token is not valid or that the token is expired, validation of the ID token fails in operation 448. In response to determining that the signature of the token is valid and that the token is not expired, validation of the ID token succeeds in operation 450.

Table 3 illustrates an exemplary implementation of the method 400.

TABLE 3

| JWT_ID_TOKEN Validation Procedure. |
| --- |
| Issuer claim will be extracted and comparted with Trusted list of Issuers. |
| Call issuer url + ".well-known/openid-configuration" and extract jwks_uri which holds URI to list of public keys of issuer. |
| Public Key will be fetched by calling jwks issue url. JWKS API will be called to get list of public keys (as extracted from ".well-known/openid-configuration") |
| From List of JWKS entry with matching 'kid' passed in header will be used. |
| Signature Validation will be carried out. |

Figure 5A:
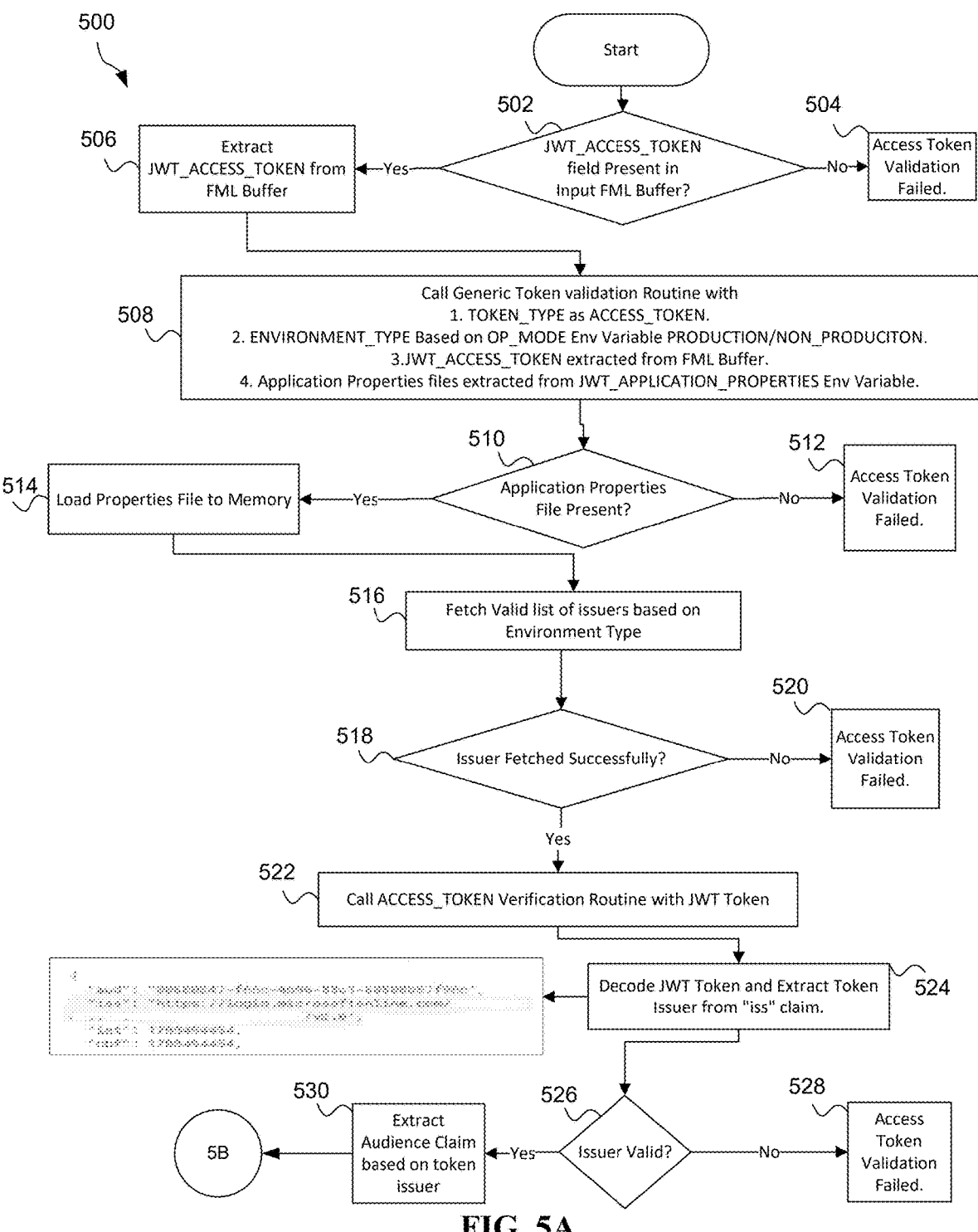
FIGS. 5A-B illustrate a method of a Tuxedo server for validating an access token included in a plurality of JSON web tokens of a service call, in accordance with one embodiment.
Figure 5B:
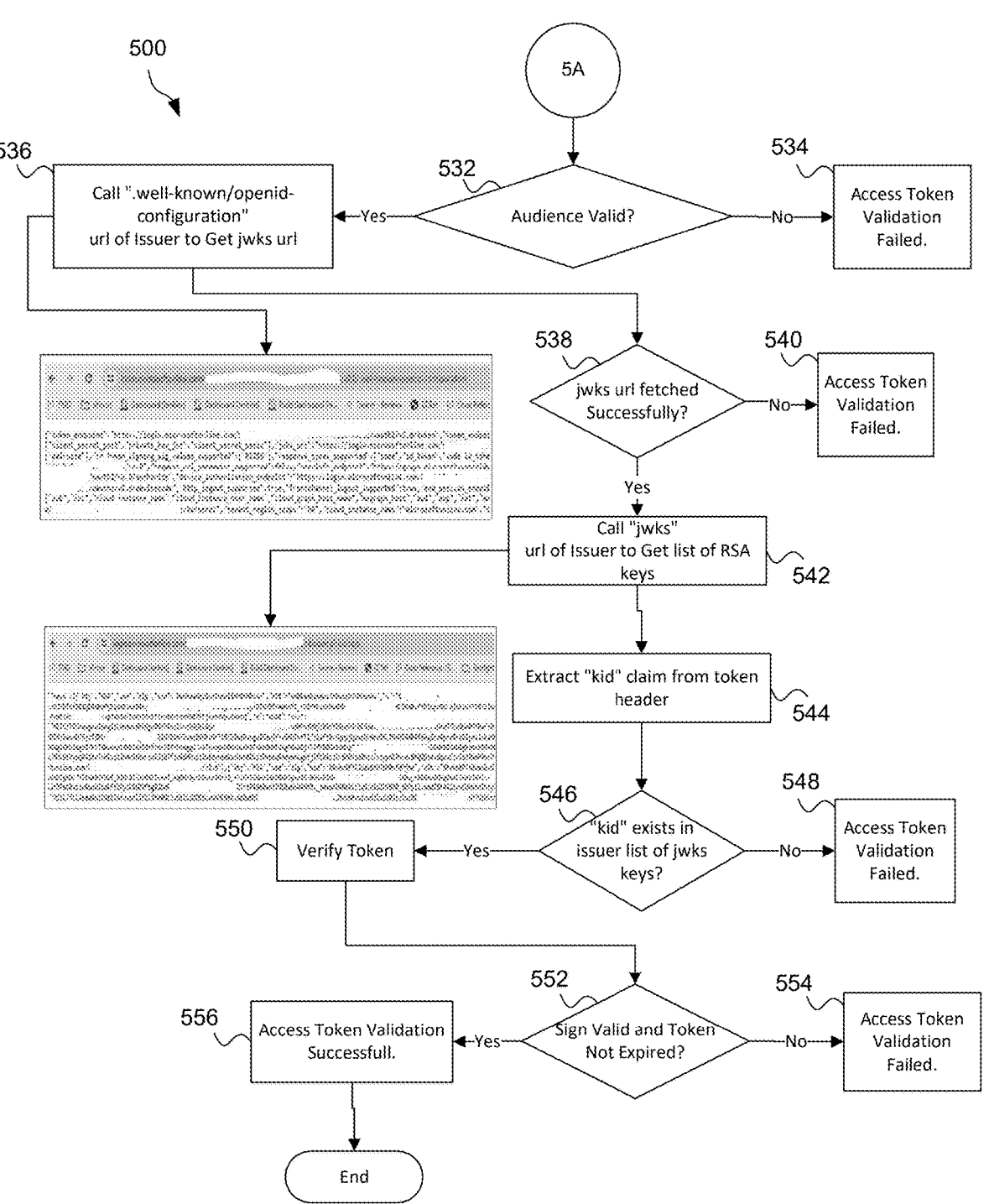

FIGS. 5A-B illustrate a method 500 of a Tuxedo server for validating an access token included in a plurality of JSON web tokens of a service call, in accordance with one embodiment. As an option, the method 500 may be carried out in the context of the details of the previous figure and/or any subsequent figure(s). For example, the method 500 may be carried out by the Tuxedo server 204 of FIG. 2 upon receipt of the service call of a Tuxedo client (e.g. via the method 300 of FIG. 3) or upon validation of the ID token (e.g. via method 400 of FIGS. 4A-B). Of course, however, the method 500 may be carried out in the context of any desired environment. Further, the aforementioned definitions may equally apply to the description below.

In decision 502, it is determined whether the JWT_ACCESS_TOKEN field is present in the FML buffer. In response to determining that the JWT_ACCESS_TOKEN field is not present in the FML buffer, validation of the access token fails in operation 504 and the method 500 ends. In this case, the service call fails and the Tuxedo client is notified.

In response to determining that the JWT_ACCESS_TOKEN field is present in the FML buffer, the JWT_ACCESS_TOKEN is extracted from the FML buffer in operation 506. In operation 508, a generic token validation routine is called with parameters that include (1) token type as ACCESS_TOKEN, (2) environment type, (3) the JWT_ACCESS_TOKEN extracted from the FML buffer, and (4) properties of the Tuxedo client included in a properties file.

Operations 510-518 illustrate the generic token validation routine. In decision 510, it is determined whether the properties file is present. In response to determining that the properties file is not present, validation of the access token fails in operation 512. In response to determining that the properties file is present, the properties file is loaded to memory in operation 514. In operation 516, a valid list of issuers is fetched based on the environment type.

In decision 518, it is determined whether the valid list of issuers was fetched successfully. In response to determining that the valid list of issuers was not fetched successfully, validation of the access token fails in operation 520. In response to determining that the valid list of issuers was fetched successfully, an identifier token validation routine is called with the JWT_ACCESS_TOKEN in operation 522.

In operation 524, the JWT_ACCESS_TOKEN is decoded and the token issuer is extracted from an "iss" claim in the token. In decision 526 it is determined whether the issuer is valid (per the valid list of issuers). In response to determining that the issuer is not valid, validation of the access token fails in operation 528. In response to determining that the issuer is valid, an audience claim is extracted from the access token based on the issuer in operation 530.

In decision 532, it is determined whether the audience is valid. In response to determining that the audience is not valid, validation of the access token fails in operation 534. In response to determining that the audience is valid, a call is made to the issuer to get a JWKS URL in operation 536.

In decision 538, it is determined whether the JWKS URL was fetched successfully. In response to determining that the JWKS URL was not fetched successfully, validation of the access token fails in operation 540. In response to determining that the JWKS URL was fetched successfully, the JWKS URL of the issuer is called to get a list of RSA keys in operation 542. In operation 544, a "kid" is extracted from the token header.

In decision 546, it is determined whether the "kid" exists in the issuer list of JWKS keys. In response to determining that the "kid" does not exist in the issuer list of JWKS keys, validation of the access token fails in operation 548. In response to determining that the "kid" does exist in the issuer list of JWKS keys, the token is verified in operation 550. In decision 552, it is determined whether a signature of the token is valid and whether the token is expired. In response to the determining that the signature of the token is not valid or that the token is expired, validation of the access token fails in operation 554. In response to determining that the signature of the token is valid and that the token is not expired, validation of the access token succeeds in operation 556.

Table 4 illustrates an exemplary implementation of the method 500.

TABLE 4

| JWT_ACCESS_TOKEN Validation Procedure. |
| --- |
| Issuer claim will be extracted and comparted with Trusted list of Issuers. |
| Call issuer url + "well-known/openid-configuration" and extract jwks_uri which holds URI to list of public keys of issuer. |
| Public Key will be fetched by calling jwks issue url. JWKS API will be called to get list of public keys (as extracted from ".well-known/openid-configuration") |
| From List of JWKS entry with matching 'kid' passed in header will be used. |
| Signature Validation will be carried out. |
| "cnf" claim which hold public key of calling application will be extract which will be used for JWT_POP_TOKEN validation. |
| Client ID Verification will be carried out. Which claim (aud,cid,appid etc.) to use for client id verification will be configured based on issuer. |

Figure 6A:
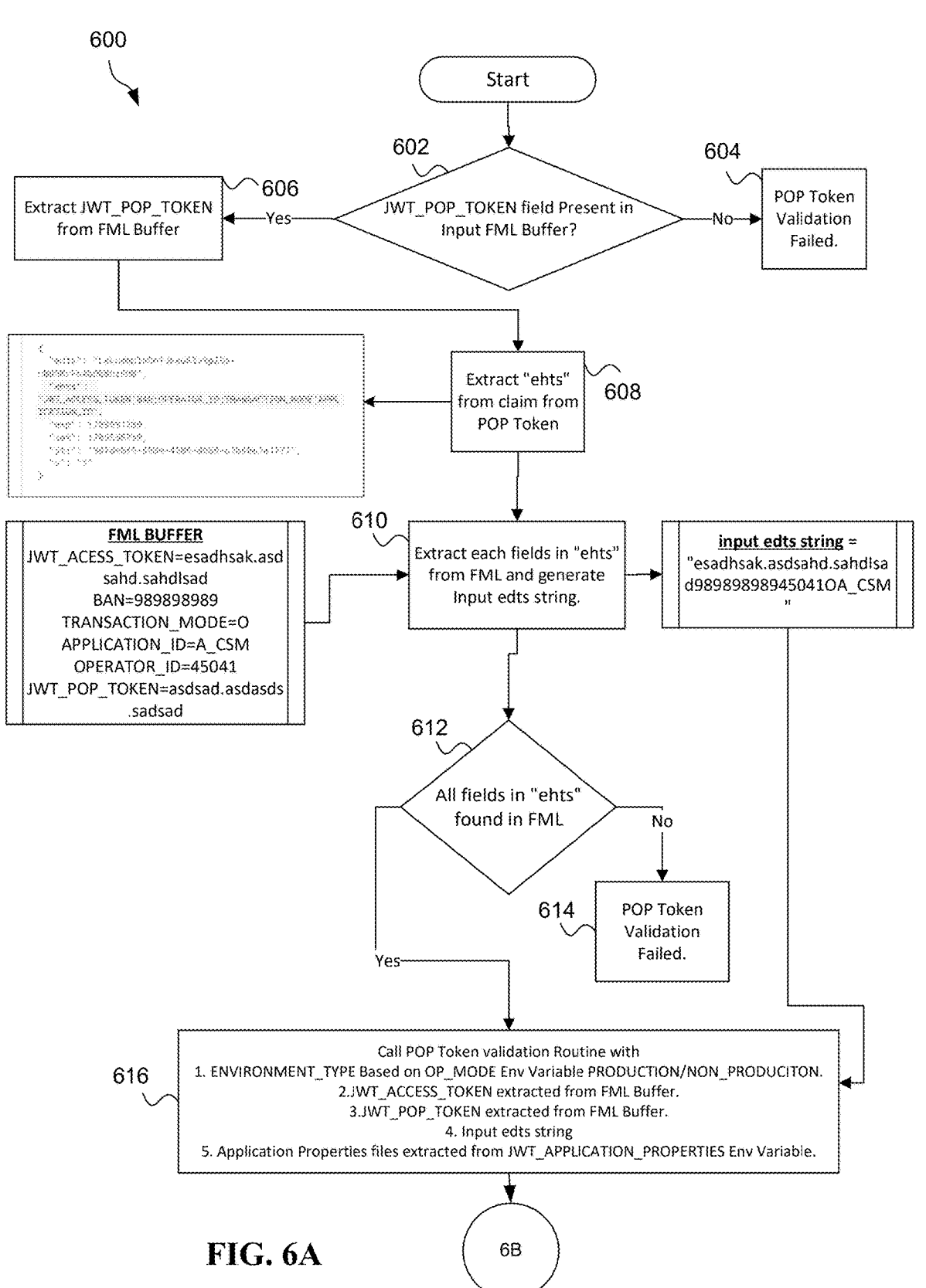
FIGS. 6A-B illustrate a method of a Tuxedo server for validating a proof of possession token included in a plurality of JSON web tokens of a service call, in accordance with one embodiment.
Figure 6B:
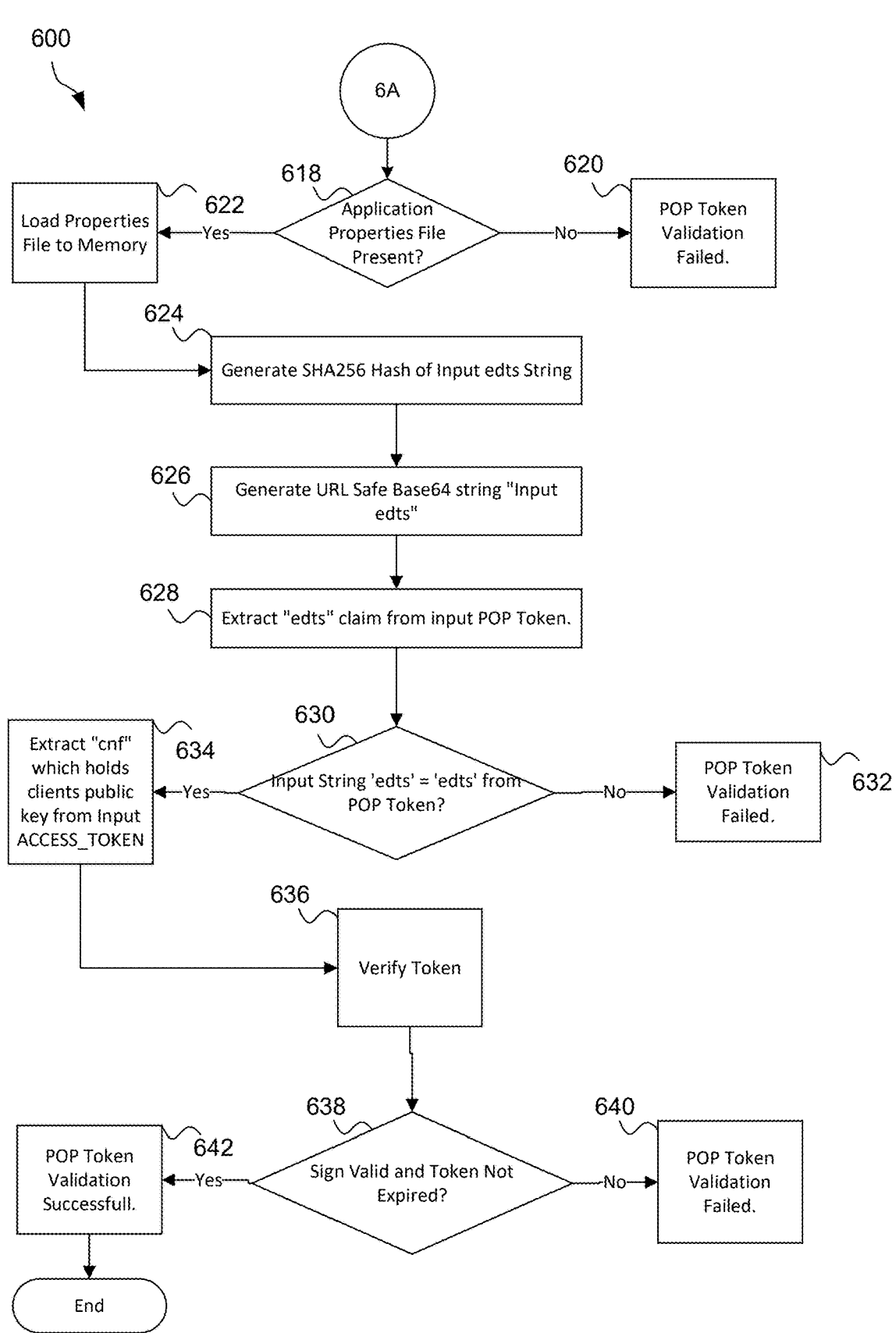

FIGS. 6A-B illustrate a method 600 of a Tuxedo server for validating a proof of possession token included in a plurality of JSON web tokens of a service call, in accordance with one embodiment. As an option, the method 600 may be carried out in the context of the details of the previous figure and/or any subsequent figure(s). For example, the method 600 may be carried out by the Tuxedo server 204 of FIG. 2 upon receipt of the service call of a Tuxedo client (e.g. via the method 300 of FIG. 3) or upon validation of the access token (e.g. via method 500 of FIGS. 5A-B). Of course, however, the method 600 may be carried out in the context of any desired environment. Further, the aforementioned definitions may equally apply to the description below.

In decision 602, it is determined whether the JWT_POP_TOKEN field is present in the FML buffer. In response to determining that the JWT_POP_TOKEN field is not present in the FML buffer, validation of the proof of possession token fails in operation 604 and the method 600 ends. In this case, the service call fails and the Tuxedo client is notified.

In response to determining that the JWT_POP_TOKEN field is present in the FML buffer, the JWT_POP_TOKEN is extracted from the FML buffer in operation 606. In operation 608, the ehts is extracted from the JWT_POP_TOKEN. In operation 610, each field listed in the ehts is extracted and an input edts string is generated. In decision 612, it is determined whether all fields in the ehts are found in the FML. In response to determining that all fields in the ehts are not found in the FML, validation of the proof of possession token fails in operation 614.

In response to that all fields in the ehts are found in the FML, proof of possession token validation procedure is called in operation 616 with (1) an environment type, (2) the JWT_ACCESS_TOKEN extracted from the FML, (3) the JWT_POP_TOKEN extracted from the FML, (4) the input edts string, and (5) properties of the Tuxedo client included in a properties file.

In decision 618, it is determined whether the properties file is present. In response to determining that the properties file is not present, validation of the proof of possession token fails in operation 620. In response to determining that the properties file is present, the properties file is loaded to memory in operation 622. In operation 624, a hash of the input edts string is generated.

In operation 626, a URL safe string "input edts" is generated. In operation 628, edts is extracted from the proof of possession token. In decision 630, it is determined whether the "input edts" is equal to (matches) the edts extracted from the proof of possession token. In response to determining that the "input edts" is not equal to the edts extracted from the proof of possession token, validation of the proof of possession token fails in operation 632.

In response to determining that the "input edts" is equal to the edts extracted from the proof of possession token, in operation 634 "cnf" is extracted from the input ACCESS_TOKEN which holds the Tuxedo client's public key. In operation 636, the proof of possession token is validated. In decision 638, it is determined whether a signature of the token is valid and whether the token is expired. In response to the determining that the signature of the token is not valid or that the token is expired, validation of the proof of possession token fails in operation 640. In response to determining that the signature of the token is valid and that the token is not expired, validation of the proof of possession token succeeds in operation 642.

Table 5 illustrates an exemplary implementation of the method 600.

TABLE 5

JWT_POP_TOKEN Validation Procedure
 JWT will be verified against respective public key received in
 ACCESS_TOKEN in "cnf" claim.
  If Verification failed call to tuxedo service will fail.
 If Verification succeeds.
  url safe base64 encoded string which will be of SHA256 hash of
  concatenated string created from value of all input FML fields
  in order mentioned in "ehts" will be created and compared
  against "edts" received in JWT.
  In case of mismatch service call will fail.

Figure 7:
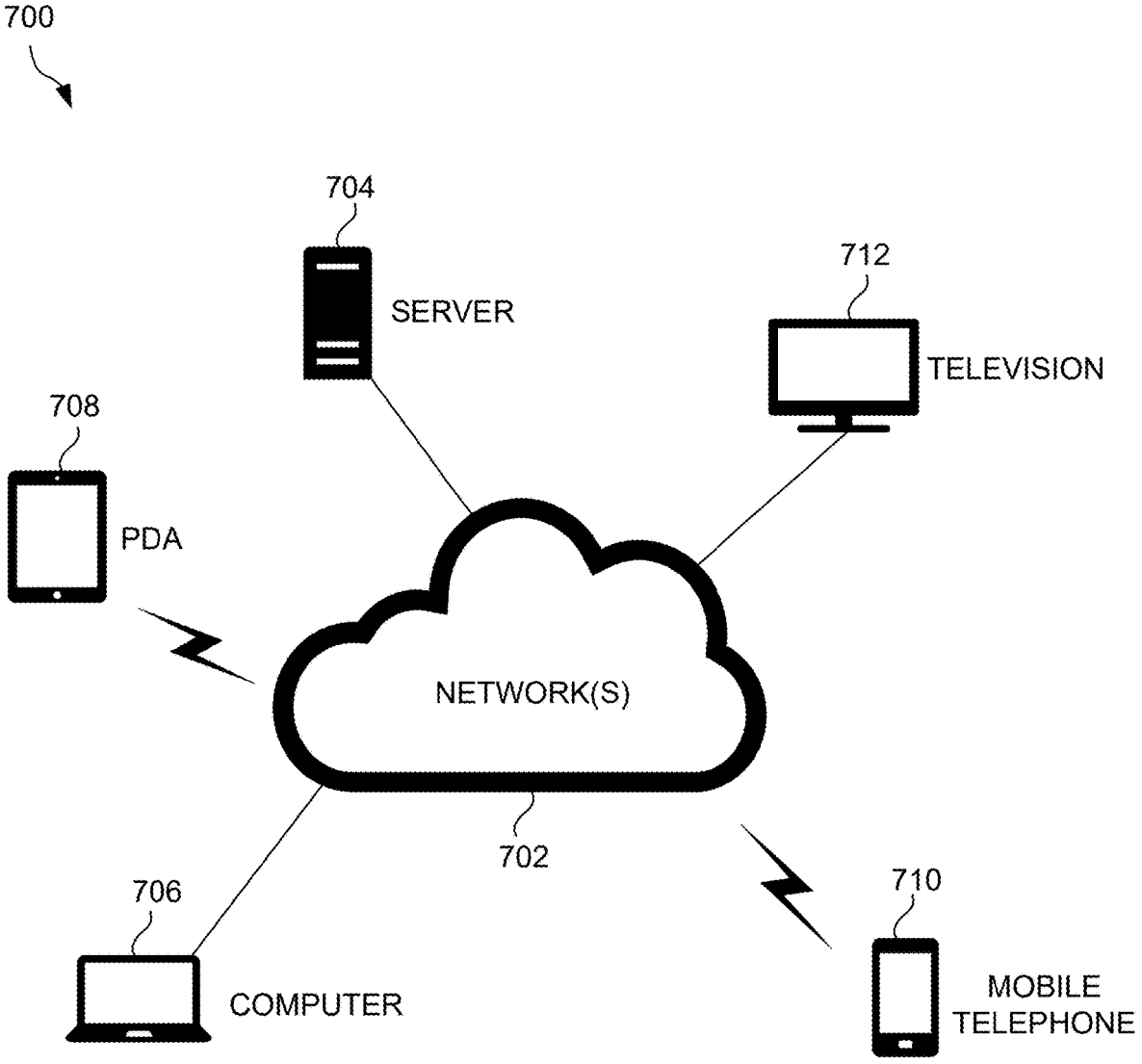
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
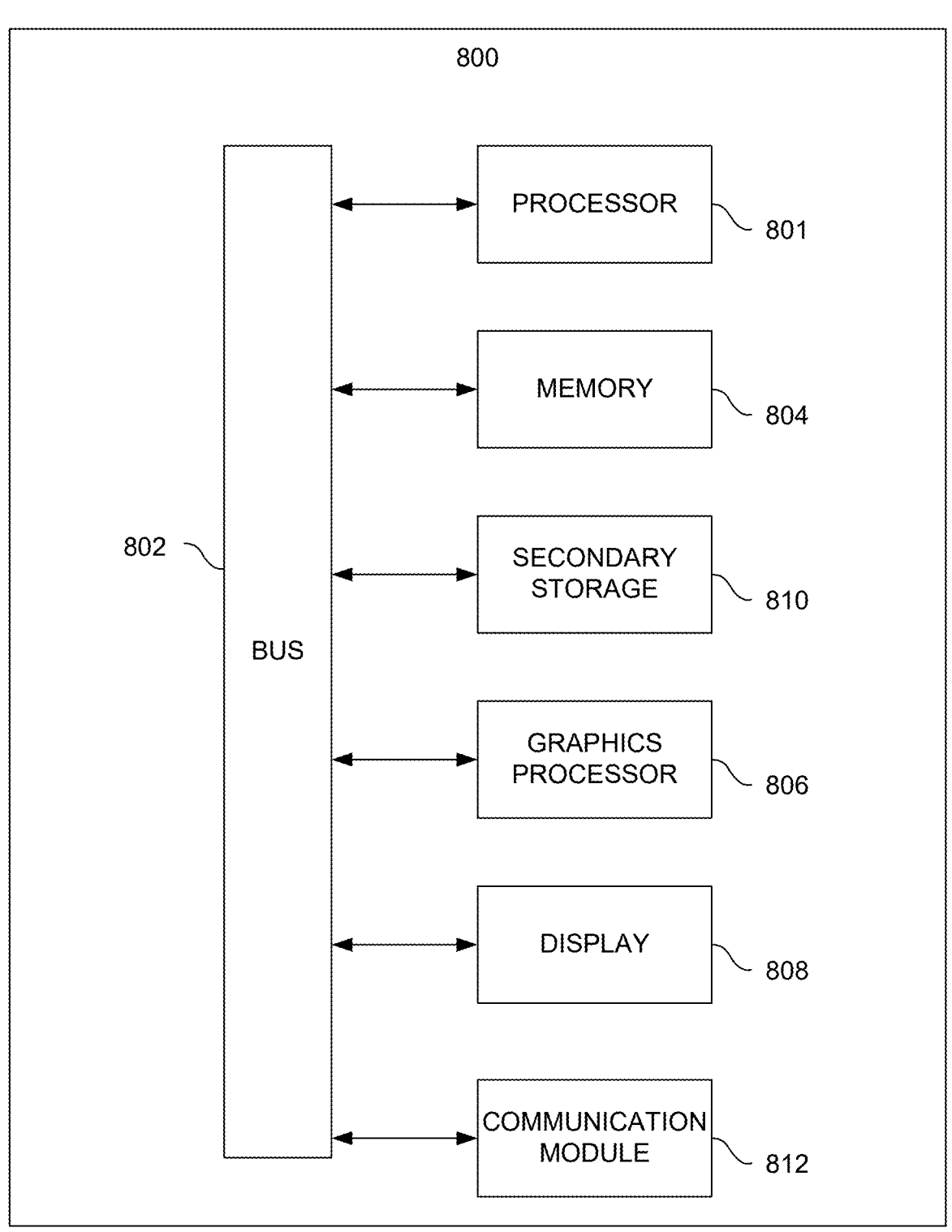
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   receive, by a server that operate as a middleware platform to manage distributed transaction processing in a distributed computing environment comprised of a plurality of client devices, a service call from one of the client devices, wherein the service call is comprised of a plurality of JavaScript Object Notation (JSON) web tokens that include:
   an identifier token held by the client device, and
   an access token that has been provided to the client device by an identity provider (IDP);
   validate the plurality of JSON web tokens, directly by the server, to authenticate and authorize the client device; and
   provide to the client device a response to the service call, by the server, based on a result of the validating.

2. The non-transitory computer-readable media of claim 1, wherein the identifier token is issued to the client device or generated by the client device.

3. The non-transitory computer-readable media of claim 1, wherein the plurality of JSON web tokens included in the service call include a proof of possession token comprised of at least a hash of one or more portions of the service call.

4. The non-transitory computer-readable media of claim 3, wherein the proof of possession token is generated by the client device.

5. The non-transitory computer-readable media of claim 1, wherein the plurality of JSON web tokens are signed by the client device using a private key of the client device.

6. The non-transitory computer-readable media of claim 1, wherein the server stores a list of trusted issuers.

7. The non-transitory computer-readable media of claim 6, wherein the server obtains the list of trusted issuers responsive to an initial service call received by the server and caches the list of trusted issuers for use upon receipt of subsequent service calls received by the server.

8. The non-transitory computer-readable media of claim 6, wherein the server uses the list of trusted issuers to validate at least a portion of the plurality of JSON web tokens.

9. The non-transitory computer-readable media of claim 1, wherein the server stores a list of trusted client identifiers.

10. The non-transitory computer-readable media of claim 9, wherein the server uses the list of trusted client identifiers to validate at least a portion of the plurality of JSON web tokens.

11. The non-transitory computer-readable media of claim 1, wherein the response to the service call indicates a service failure when the validating of any of the plurality of JSON web tokens fails, and wherein the service failure causes the client device to be prevented from accessing a service of the server.

12. The non-transitory computer-readable media of claim 1, wherein the response to the service call indicates a service success when the validating of all of the plurality of JSON web tokens succeeds, and wherein the service success causes the client device to be granted access to a service of the server.

13. The non-transitory computer-readable media of claim 1, wherein the validating is performed to secure the server against an unauthorized service call comprised of an attack being made via the service call.

14. The non-transitory computer-readable media of claim 1, wherein the plurality of JSON web tokens are stored in a fielded buffer of the service call.

15. The non-transitory computer-readable media of claim 1, wherein the identifier token uniquely identifies the client device.

16. The non-transitory computer-readable media of claim 1, wherein the server validates the identifier token by:
accessing properties of the client device included in a properties file,
fetching a valid list of issuers based on an environment type,
extracting a token issuer from the identifier token,
validating the token issuer using the valid list of issuers,
responsive to validating the token issuer, retrieving a JSON Web Key Set (JWKS) uniform resource locator (URL) from the token issuer,
using the JWKS URL to obtain a list of keys,
extracting a key from the identifier token,
validating that the key is included in the list of keys,
responsive to validating that the key is included in the list of keys, validating that a signature of the identifier token is valid and that the identifier token is not expired, and validating the identifier token in response to validating that a signature of the identifier token is valid and that the identifier token is not expired.

17. The non-transitory computer-readable media of claim 1, wherein the server validates the identifier token by:
accessing properties of the client device included in a properties file,
fetching a valid list of issuers based on an environment type,
extracting a token issuer from the access token,
validating the token issuer using the valid list of issuers,
responsive to validating the token issuer, extracting an audience claim from the access token based on the token issuer,
validating the audience claim,
responsive to validating the audience claim, retrieving a JSON Web Key Set (JWKS) uniform resource locator (URL) from the token issuer,
using the JWKS URL to obtain a list of keys,
extracting a key from the access token,
validating that the key is included in the list of keys,
responsive to validating that the key is included in the list of keys, validating that a signature of the access token is valid and that the access token is not expired, and
validating the access token in response to validating that a signature of the access token is valid and that the access token is not expired.

18. A method, comprising:
at a computer system:
receiving, by a server that operate as a middleware platform to manage distributed transaction processing in a distributed computing environment comprised of a plurality of client devices, a service call from one of the client devices, wherein the service call is comprised of a plurality of JavaScript Object Notation (JSON) web tokens that include:
an identifier token held by the client device, and
an access token that has been provided to the client device by an identity provider (IDP);
validating the plurality of JSON web tokens, directly by the server, to authenticate and authorize the client device; and
providing to the client device a response to the service call, by the server, based on a result of the validating.

19. A system, comprising:
a non-transitory memory storing instructions; and
one or more processors in communication with the non-transitory memory that execute the instructions to:
receive, by a server that operate as a middleware platform to manage distributed transaction processing in a distributed computing environment comprised of a plurality of client devices, a service call from one of the client devices, wherein the service call is comprised of a plurality of JavaScript Object Notation (JSON) web tokens that include:
an identifier token held by the client device, and
an access token that has been provided to the client device by an identity provider (IDP);
validate the plurality of JSON web tokens, directly by the server, to authenticate and authorize the client device; and
provide to the client device a response to the service call, by the server, based on a result of the validating.

* * * * *